(12) United States Patent
Tsuta

(10) Patent No.: US 8,345,007 B2
(45) Date of Patent: Jan. 1, 2013

(54) METHODOLOGY OF READING

(75) Inventor: Tomohiro Tsuta, Kobe (JP)

(73) Assignee: Tomohiro Tsuta, Kobe (JP)

( * ) Notice: Subject to any disclaimer, the term of this patent is extended or adjusted under 35 U.S.C. 154(b) by 86 days.

(21) Appl. No.: 13/066,302

(22) Filed: Apr. 13, 2011

(65) Prior Publication Data

US 2011/0254768 A1 Oct. 20, 2011

(30) Foreign Application Priority Data

Apr. 20, 2010 (JP) ................................ 2010-110634

(51) Int. Cl.
*G06F 3/033* (2006.01)
*G09G 5/08* (2006.01)
(52) U.S. Cl. ......... 345/163; 345/156; 345/160; 715/230
(58) Field of Classification Search .......... 345/156–160, 345/163, 169, 173; 715/230
See application file for complete search history.

(56) References Cited

U.S. PATENT DOCUMENTS

| 5,537,525 | A * | 7/1996 | Gotoh et al. | 715/223 |
| 6,519,605 | B1 * | 2/2003 | Gilgen et al. | 1/1 |
| 2002/0116421 | A1 * | 8/2002 | Fox et al. | 707/526 |

* cited by examiner

*Primary Examiner* — Kimnhung Nguyen

(57) ABSTRACT

A method for reading mapping on electronic documents, the method including: showing a text to be read on an electronic display; showing a mouse cursor on the electronic display to be used by a reader as a reading assist; storing on a memory device, in association with the text to be read, a state of the mouse cursor moved by the reader who reads the text, as information reflecting the reader's reading state; showing, on an electronic display, an already read text whose state of the mouse cursor has already been stored on a memory device; and mapping onto the already read text, the stored state of the mouse cursor read out from a memory device, as a trace reflecting the reading state of the previous reading.

1 Claim, 5 Drawing Sheets

人間の瞬時記憶容量の少なさ、そのexclusion特性、等のために、次に記すようなある程度不都合な現象が人間に生じ得る。
長文等を読解する際、段落単位から逐次抽出される要点を、箇条書き程に明確に、瞬時記憶に保持することができない現象。
今読んでいる段落内容が、それより前の段落に関する記憶内容を、瞬時記憶容量からexclusion排除する現象。
辞書を見ながら英文等を読む場合等、辞書を読むことにより英文内容が、瞬時記憶容量からexclusion排除されてしまう現象。
論題話題が変わると、前の論題話題が瞬時記憶容量から排除されてしまう現象。
従って、論議の一貫性を保つのが難しい現象。
しかし、人間の記憶空間には補完的な短時間内一機能があり、記憶空間の利用度が変化する時等に、記憶空間内検索力が増し、時間的に少し前に瞬時記憶容量に保持されていた誘導源論題を、当該外部由来の誘導源なしに、記憶空間内部で思い出せる能力がある。
容量への誘導源の投入量を相当程度減少させる等の方法により、人間は、それ迄に容量が処理していた旧誘導源群等に関する情報を、受動的に要約状態で記憶空間に思い出すことができる場合がある。短時間内一機能による現象であり、容量への誘導源投入量が減少した時より少し前に容量が理解共鳴処理を行っていた旧誘導源群並びにそれらに関する理解内容を、記憶空間に受動性に再現できる場合がある。
短時間内一による、意図せずに要約的記憶の生成が可能になる場合である。
しかしその短時間内一機能により思い出される論題は、時間的に直前の論題であるとは限らないため、論理上あるいは学習上不都合な時がある。短時間内一機能は、より記憶実用度順、記憶空間内時間距離短縮度順に記憶再現を行っている可能性がある。

METHODOLOGY OF READING

BACKGROUND OF THE INVENTION

In general, a text particularly on an electronic display can be very hard to be read (deeply fathomed) by a reader due to the difficulty of holding view point optimally (with spatiotemporal optimality (precision)) at where to be gazed at by the reader, and the best possible information absorption from an electronically displayed text is frequently unattained. Without achieving adequate absorption of information, the reader would gradually lose the willingness to read the electronically displayed texts.

It is currently very difficult to underline (highlight) the segments of an electronically displayed text (electronic document) a reader wants underlined (highlighted) at will with rapidity, compared to manually underlining (highlighting) a printed text.

This could result in a reader's forgetting most of what has once been understood from laborious, time-consuming reading of an electronically displayed text, because afterwards it can become very hard for the reader to reread that text selectively and efficiently with laying emphasis on the segments especially important for the reader.

A reader's manually underlining (highlighting) several segments in a (printed) text could interfere with continuousness of reading when a segment to be underlined (highlighted) is retroactively determined after adjacent, prior several lines (or segments) have been read by the reader.

Although establishing what comprehended from reading as practical knowledge necessitates rereading (review), effective rereading (review) is extremely difficult to be practiced without the present invention.

SUMMARY OF THE INVENTION

The present invention is
A method for reading mapping on electronic documents, the method including:
  showing a text to be read on an electronic display;
  showing a mouse cursor on the electronic display to be used by a reader as a reading assist;
  storing on a memory device, in association with the text to be read, a state of the mouse cursor moved by the reader who reads the text, as information reflecting the reader's reading state;
  showing, on an electronic display, an already read text whose state of the mouse cursor has already been stored on a memory device; and
  mapping onto the already read text, the stored state of the mouse cursor read out from a memory device, as a trace reflecting the reading state of the previous reading.

BRIEF DESCRIPTION OF THE DRAWINGS

FIG. 5 is a diagram showing a preferred embodiment of the present invention.

DETAILED DESCRIPTION OF THE INVENTION

On the discovery of new methodology of reading.

The novel and powerful reading method discovered by me and proposed here is that nearly perfect reading (at realizable maximum speed) can become possible (even for those with learning disabilities (or difficulties) in reading) by carrying out reading while punctually waiting (pausing) at each word or phrase (encountered successively in the reading) adequately until a considerable (satisfying) degree of understanding to it has been attained in the reader's mind. (or until an understanding beyond the immediately obtainable easy perception toward it has been generated in the reader's mind.) (or until an understanding that is substantial, not superficial, toward it has (first) been generated in the reader's mind.)

Such waits can be optimally secured with the help of the computer, since trying to maintain them only using the eyes can be quite a challenge.

The teaching methodology and materials and educational devices to implement this method could be developed.

For example, an educational device could be developed which can automatically map the material read (for convenience of later use or pertinent, quick review), based on information of the waits (waiting state), taking advantage of the fact that such waits could be regarded as reflecting the reading states (e.g., degrees of difficulty, interest, etc.) for the reader to each (corresponding) word or phrase).

My discovery (and invention) would specifically contribute to (fundamentally) resolving the hardships for those with difficulties in reading and learning, as well as to helping realize more fruitful, efficient (much deeper) (, internally very interactive) reading (and learning) for those without such difficulties.

My discovery (and invention) can prominently increase reader's willingness to read.

For everyone, to be able to become proficient in reading (by my discovery and invention) has positive impacts on all over the fields.

The promotion of my discovery and invention can become great technological innovation in education, since it can prominently raise the invest efficiency of education.

On the novel invention regarding electronic documents.

The invention is for storing (on a memory device) the staying (transition) state (e.g., moving state, sojourn state, tracing state, etc.) of a mouse cursor on an electronic display that is moved by a reader (for a reading assist (symbol) (tracing a text)) who reads a text shown on the electronic display, in association with the text, as information reflecting the reader's reading states (e.g., degrees of difficulty, interest, etc.).

Figure 1:
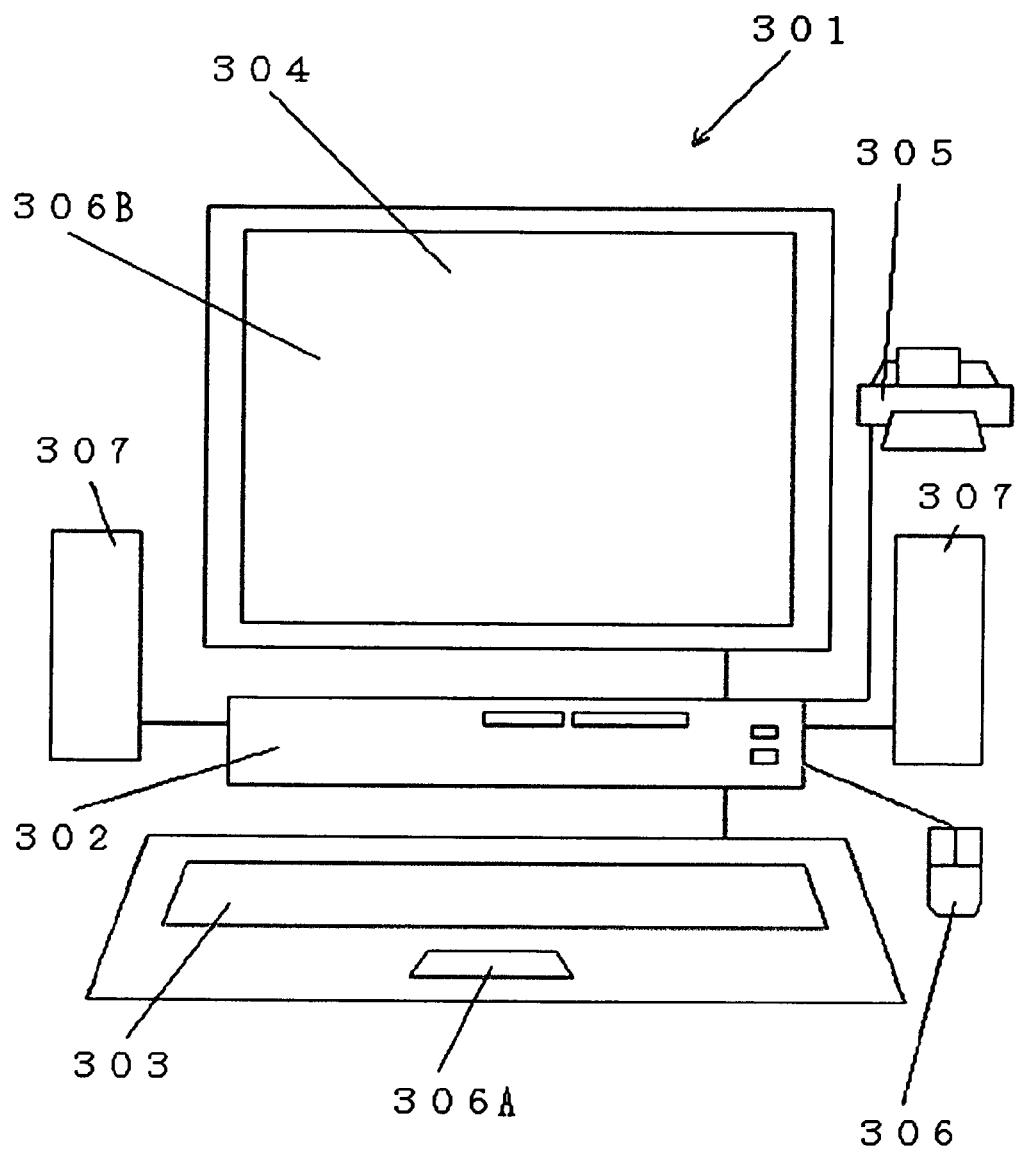
FIG. 1 is a diagram showing a preferred embodiment of the system of the present invention.
Figure 2:
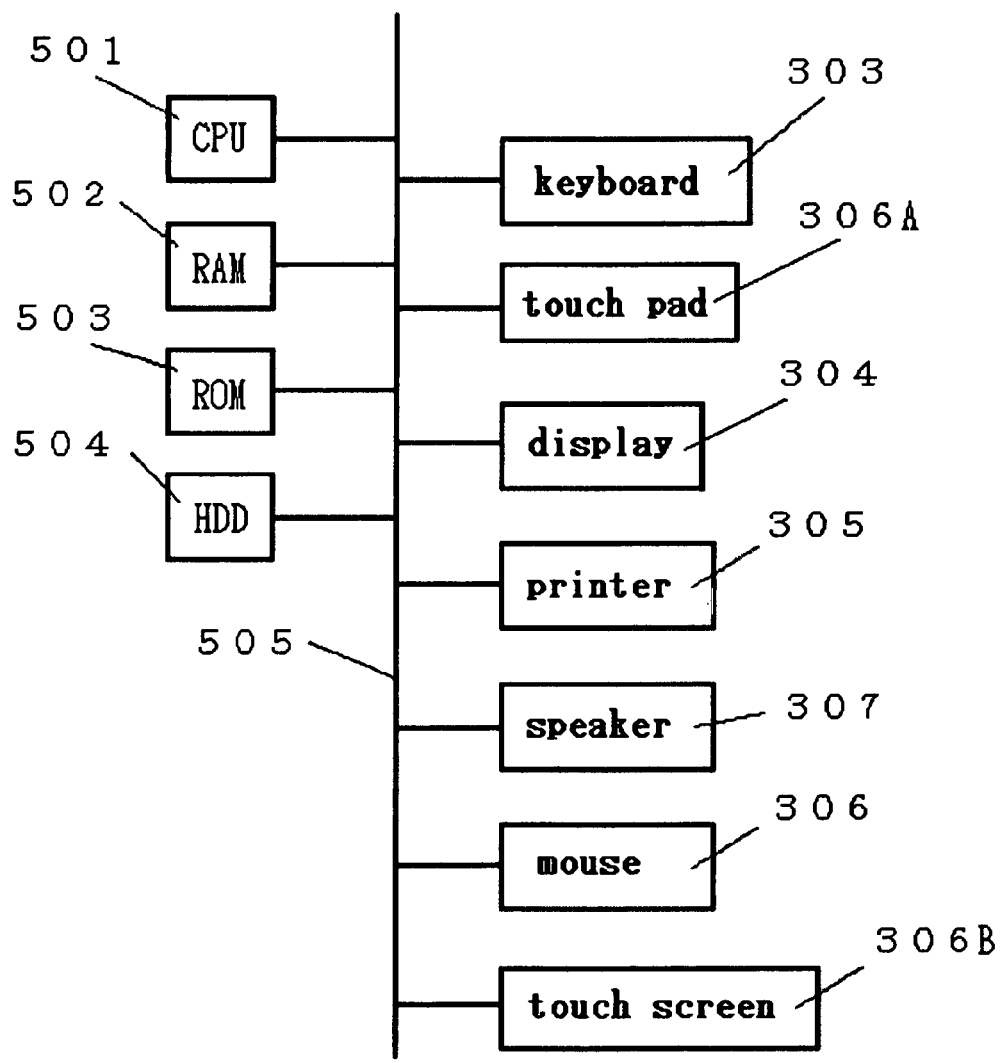
FIG. 2 is a block diagram showing a preferred embodiment of the hardware configuration of a CPU in the present invention.
Figure 3:
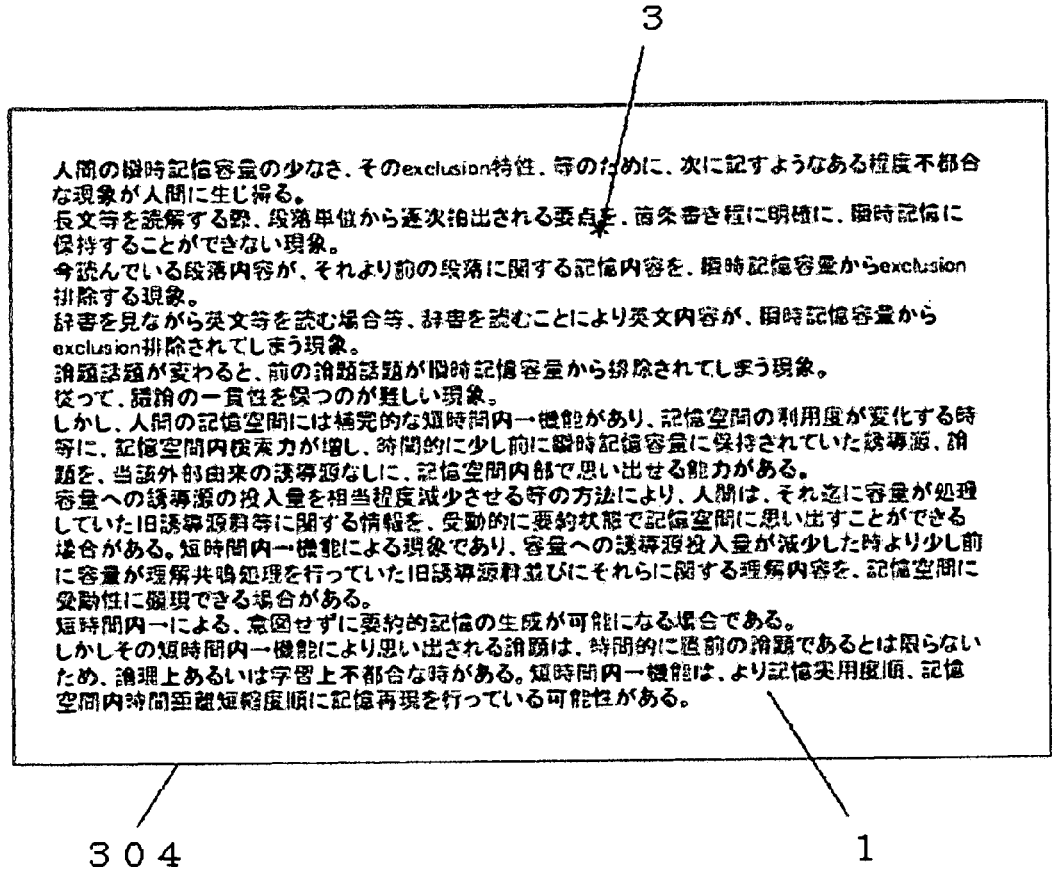
FIG. 3 is a diagram showing a preferred embodiment of the present invention.
Figure 4:
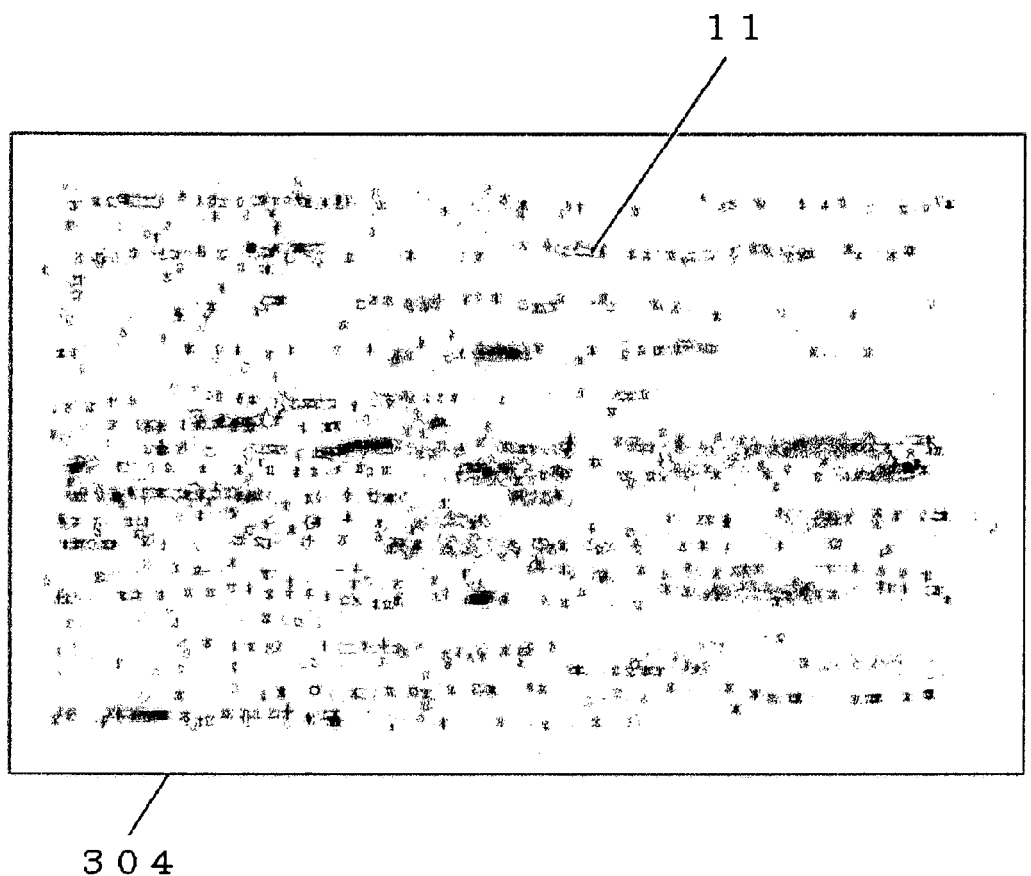
FIG. 4 is a diagram showing a preferred embodiment of the present invention.

(i.e., Showing a text to be read (for example, a text 1 shown in FIG. 3) on an electronic display (for example, on a display 304 shown in FIG. 1, FIG. 2, and FIG. 3);

Showing a mouse cursor on the electronic display to be used by a reader as a reading assist. (The mouse cursor is an embodiment of a reading assist (symbol) for the reader (i.e., an example of the symbol (e.g., an attention symbol 3 shown in FIG. 3.) to keep a reader's attention to a point at which the symbol is displayed).);

Storing on a memory device (, such as a RAM (Random Access Memory) 502, a ROM (Read Only Memory) 503, a HDD (Hard Disc Drive) 504 (, as shown in FIG. 2), a recording media (storage media), etc.), in association with the text to be read (for example, a text 1 shown in FIG. 3), a state of the mouse cursor moved by the reader who reads the text (for example, a state of the mouse cursor 11 as shown in FIG. 4), as information reflecting the reader's reading state;)

When a text already read using my (discovery and) invention is shown on an electronic display later, my invention could allow for mapping the prior (recorded) reading state onto the text as a trace reflecting the reading state of the previous reading.

(i.e., Showing, on an electronic display (for example, on a display 304 shown in FIG. 1, FIG. 2, and FIG. 4), an already read text (to be reread (reviewed)) (for example, a text 1 shown in FIG. 5) whose state of the mouse cursor (for example, a state of the mouse cursor 11 as shown in FIG. 4) has already been stored on a memory device (, such as a RAM (Random Access Memory) 502, a ROM (Read Only Memory) 503, a HDD (Hard Disc Drive) 504 (, as shown in FIG. 2), a recording media (storage media), etc.);

and Mapping onto the already read text (for example, the text 1 shown in FIG. 5), the stored state of the mouse cursor (for example, the state of the mouse cursor 11 as shown in FIG. 4 and FIG. 5) read out from the memory device, as a trace reflecting the reading state of the previous (stored) reading.)

(The mouse cursor is an embodiment of a reading assist (symbol) for the reader (i.e., an example of the symbol (e.g., an attention symbol 3 shown in FIG. 3.) to keep a reader's attention to a point at which the symbol is displayed).);

The information on the staying state (tracing state) of the mouse cursor moved by a reader in an electronic display can be utilized as represents the degree of difficulty and interest (reading state) for the reader toward the corresponding locations (stayed at (traced) (transited) by the mouse cursor) on the display.

When a text already read by a reader using my (discovery and) invention is shown on an electronic display later, my invention could reproductively map the reader's reading efforts (reading state) exerted in the prior reading of the text, by applying, for example, shadings to each locations on the text shown, based on the staying (transition) times (sojourn times), staying (transition) movement, tracing movement, etc. of the mouse cursor at each locations which were recorded at the prior reading.

(e.g., in the mapping, stronger emphasis (in terms of representation aspect) may be applied to segments of a text read where slower mouse cursor movement has been recorded.)

This reading state mapping could enable a reader to quickly overview and review a text already read using my (discovery and) invention, because the mapping could serve for the reader as a reminder of the previous reading state (degrees of difficulty, interest, etc.) (previous reading comprehension state).

Contrary to the reader's manually underlining (highlighting) several segments in a printed text, which may interfere with continuousness of reading when a segment to be underlined (highlighted) is retroactively determined after adjacent, prior several lines have been read by the reader, My (discovery and) invention could realize the automatic and efficient storing of a reader's reading effort (reading state) in association with the text read, in the form of a trace (to which shadings (or some emphasis (e.g., in terms of (font) color, font size, underlining, highlighting, etc.)) could be applied according to variation in the reading state), requiring nothing more than the reader's dedication to reading (comprehending) the text on an electronic display utilizing the mouse cursor (positioning the mouse cursor (transitioning) over a word (a character), a few words (a few characters) or phrase in the text) actively and adaptively (e.g., agilely slowing the mouse cursor (along the line (currently read)) over the segments (words or phrases) of higher degrees of difficulty or interest (hence inducing a pursuit eye movement with very high precision (in terms of reading) even over the statically displayed text (moveless text), by the reader's pursuing the mouse cursor that is controlled by the reader), and if needed, wiggling back and forth (in the vicinity of fovea of the visual field and within about macular area of the visual field along the line (currently read)) or pausing the mouse cursor (to be thoroughly gazed at) (when) over the segments (words or phrases) of much higher degrees of difficulty or interest in order to garner and develop the reader's further attention to the mouse cursor location. And agilely speeding the mouse cursor (along the line (currently read)) (when) over the segments (words or phrases) of lower degrees of difficulty or interest (hence inducing a saccade-like eye movement optimally controlled for reading by the (reader's) mouse cursor positioning).

It is currently very difficult to underline (highlight) the segments of an electronically displayed text (electronic document) a reader wants underlined (highlighted) at will with rapidity, compared to manually underlining (highlighting) a printed text.

This could result in a reader's forgetting most of what has once been understood from laborious, time-consuming reading of an electronically displayed text, because afterwards it can become very hard for the reader to reread that text selectively and efficiently with laying emphasis on the segments important for the reader.

My invention could enable a reader to reread and review a text already read using my (discovery and) invention, with enjoyment and with effectiveness because my invention can map the reader's reading state graphically (and colorfully) on the text.

The present invention could facilitate effective rereading (review) which is extremely difficult to be practiced without the present invention, although establishing what comprehended from reading as practical, solid knowledge necessitates the rereading (review).

In general, a text on an electronic display can be very hard to be read by a reader due to the difficulty of holding view point (with (much) patience) for optimal time period (, which is (mostly) felt too lengthy for the reader to wait,) (enough to attain a satisfying (substantial) comprehension toward what is denoted at the view point), and the best possible information absorption from an electronically displayed text is frequently unattained.

Without achieving adequate absorption of information, the reader would gradually lose the willingness to read electronically displayed texts.

Contrary to this, if the reader reads a text on an electronic display using a mouse cursor actively and adaptively (in terms of (securing time required in) attaining (a satisfying degree of) comprehension (of each word or phrase) locally (microscopically) (without becoming impatient) (and then sequentially proceeding in the same way)) as my discovery and invention propose, the text on the electronic display can instantly become greatly readable for the reader and a very fruitful reading (the best possible information absorption) can be realized by the reader.

My invention intends to store this unprecedentedly fruitful (thorough and deep) reading state in association with the electronically displayed text (from the viewpoint of attaining (satisfying) (substantial) comprehension locally (microscopically) (in a text)).

My invention could also be applied to store reading state of figures and charts. My invention could allow for storing (and mapping on the chart read) the staying (transition) state (sojourn state) (tracing state) of the mouse cursor moved by a reader who appreciates (reads) a chart shown on an electronic display, in association with the chart, as information reflecting the degree of difficulty and level of interest for the reader toward the corresponding locations on the chart (for later reference in review).

The state of the mouse cursor irrelevant to reading (comprehension) (appreciation) may be omitted in the (reading) (states) mapping.

The average time (speed) of reading per line, several lines, or page may (also) be mapped (graphically (e.g., applying shadings (or some emphases) to the text based on the time)) in the (reading)(states) mapping. The average state (e.g., waits) of the mouse cursor per line, several lines, or page may (also) be mapped (graphically (e.g., applying shadings (or some emphases) to the text based on the state)) in the (reading) (states) mapping.

The scroll speed may (also) be mapped (graphically (e.g., applying shadings (or some emphases) to the text based on the speed)) in the (reading)(states) mapping.

(The (reading)(states) recording (storing) may be automatically started (e.g., when a file is opened) without requiring any direction from a reader (, in order to induce the reader's concentration on reading).)

(Segments (components) of what already read using my (discovery and) invention may be sorted, rearranged, ranked, reorganized, or extracted, based on the recorded (stored) states of the mouse cursor (in the (reading)(states) mapping).)

With an aim to (precisely) evaluate (e.g., grading) the degree (level) of a reader's reading (states) of a text without requiring any linguistic or translational expression from the reader:
An invention is
A method for evaluating the degree of a reader's reading of a text without requiring any linguistic or translational expression from the reader, the method comprising:
  detecting a reading states of a reader in reading a text;
  storing an exemplary data about reading states in reading the text; and
  evaluating the degree of the reader's reading by comparing the detected reading states of the reader with the stored exemplary data about reading states.

With an aim to (precisely) evaluating (e.g., grading) the degree (level) of a reader's reading of a text without requiring any linguistic or translational expression from the reader:
An invention is
A method for evaluating the degree of a reader's reading of a text without requiring any linguistic or translational expression from the reader, the method comprising:
  detecting delimitation by a reader in reading a text;
  storing exemplary data about delimitation in reading the text; and
  evaluating the degree of the reader's reading by comparing the detected delimitation of the reader with the stored exemplary data about delimitation.

FIG. 1 shows a computer system 301 diagrammatically. The present invention is realized by the computer system 301 carrying out a program for realizing the invention. As shown in FIG. 1, the computer system 301 realizing an embodiment of the present invention includes a main unit 302 that is equipped with a CPU (Central Processing Unit) 501, etc., which will be mentioned later, a pointing device (for example, a touch pad 306A (, if necessary a mouse 306) (, if necessary a touch screen 306B)), a display 304 (and if necessary, a keyboard 303) (and if necessary, a printer 305) (and if necessary, a speaker 307).

Next, an embodiment of the hardware configuration of the CPU 501 in the present invention is described referring to FIG. 2.

The CPU 501 in the present invention is configured specifically including:
a microprocessor such as the CPU 501, a RAM (Random Access Memory) 502, a ROM (Read Only Memory) 503, a HDD (Hard Disc Drive) 504, a display 304, a touch pad 306A, (and if necessary, a mouse 306,) (and if necessary, a touch screen 306B) (and if necessary, a keyboard 303) (and if necessary, a printer 305,) (and if necessary, a speaker 307,) (and if necessary, a communications interface).

These parts are connected via a bus 505. The HDD 504 is connected through the input-output interface to the bus 505. The display 304 is connected through the input-output interface to the bus 505, which enables output to the display 304 of (image) data input from the CPU 501. The touch pad 306A is connected through the input-output interface to the bus 505, which enables output to the CPU 501 of input through the touch pad 306A. (The mouse 306 is connected through the input-output interface to the bus 505, which enables output to the CPU 501 of input through the mouse 306.) (The touch screen 306B is connected through the input-output interface to the bus 505, which enables output to the CPU 501 of input through the touch screen 306B.) (The keyboard 303 is connected through the input-output interface to the bus 505, which enables output to the CPU 501 of input by the keyboard 303.) (The printer 305 is connected through the input-output interface to the bus 505, which enables.output by the printer 305 of input from the CPU 501.) (The speaker 307 is connected through the input-output interface to the bus 505, which enables output by the speaker 307 of input from the CPU 501.)

The CPU 501 carries out operations characteristic of an embodiment of the present invention, by loading onto the RAM 502 a program which is stored in the HDD (Hard Disc Drive) 504 for realizing the present invention.

The CPU 501 carries out controls, and kinds of arithmetic processing, of the present invention, according to a program for realizing the present invention.

The CPU 501 controls display processing of the display 304 (an example of the output device).

The CPU 501 may control the present invention according to input from the touch pad 306A (an example of the input device).

(The CPU 501 may control the present invention according to input from the mouse 306 (an example of the input device) .) (The CPU 501 may control the present invention according to input by the keyboard 303 (an example of the input device) .) (The CPU 501 may control the printer 305 and the like so as to output an image that is generated based on the data obtained from the present invention.) (If necessary, the CPU 501 may control the speaker 307 (an example of the output device) to produce output.) (The keyboard 303 may be used, for example, as a device for input (the input device).) (If necessary, the mouse 306 is used as a device for performing various kinds of operations of input to the display screen of the display 304.)

The display 304 is a display device (the output device), for example, of a LCD (Liquid Crystal Display), an OLED (Organic Light-Emitting Diode), a CRT (Cathode Ray Tube), or the like.

(If necessary, various screens such as an operation screen and a setting screen may be displayed on the display 304.)

And when the CPU 501 is connectable to communications network such as the Internet and a LAN (Local Area Network), the communications interface can be equipped with a network adapter such as a LAN card or communications equipment such as a modem in order to establish data communication among the network. In such a case, by installing on the network a server storing a program for realizing the present invention, and configuring the CPU 501 as a client terminal of the server, the operation of the present invention can be carried out by the client terminal.

A program for realizing the present invention can be stored on any computer-readable recording media (storage media). (And the data obtained from the present invention can be stored on any computer-readable recording media (storage media).) (And the data stored in the computer-readable recording media (storage media) can be read out from the computer-readable recording media (storage media).)

Examples of such recording media (storage media) include an optical disk, a magneto-optic disk (CD-ROM, DVD-RAM, DVD-ROM, MO, etc.), a magnetic-storage device (hard disk, Floppy Disk.TM., ZIP, etc.), a semiconductor memory, etc.

What is claimed is:

1. A method for reading mapping on electronic documents, the method comprising:
    showing a text to be read on an electronic display;
    showing a mouse cursor on the electronic display to be used by a reader as a reading assist;
    storing on a memory device, in association with the text to be read, a state of the mouse cursor moved by the reader who reads the text, as information reflecting the reader's reading state;
    showing, on an electronic display, an already read text whose state of the mouse cursor has already been stored on a memory device; and
    mapping onto the already read text, the stored state of the mouse cursor read out from a memory device, as a trace reflecting the reading state of the previous reading.

* * * * *